United States Patent
Kim et al.

(10) Patent No.: US 8,942,984 B2
(45) Date of Patent: Jan. 27, 2015

(54) METHOD AND SYSTEM FOR CONTROLLING EXTERNAL OUTPUT OF A MOBILE DEVICE

(75) Inventors: Hee Woon Kim, Suwon-si (KR); Si Hak Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 12/965,140

(22) Filed: Dec. 10, 2010

(65) Prior Publication Data
US 2011/0153323 A1    Jun. 23, 2011

(30) Foreign Application Priority Data
Dec. 18, 2009   (KR) .................. 10-2009-0127136

(51) Int. Cl.
| | | |
|---|---|---|
| *G10L 15/22* | (2006.01) | |
| *H04N 9/31* | (2006.01) | |
| *G06F 3/16* | (2006.01) | |
| *H04M 1/02* | (2006.01) | |
| *G10L 17/26* | (2013.01) | |

(52) U.S. Cl.
CPC .............. *G10L 15/22* (2013.01); *H04N 9/3173* (2013.01); *G06F 3/165* (2013.01); *H04M 1/0272* (2013.01); *H04M 2250/74* (2013.01); *G10L 17/26* (2013.01); *G10L 2015/223* (2013.01)
USPC ........................................................ 704/270

(58) Field of Classification Search
USPC .................................................. 704/235, 270
See application file for complete search history.

(56) References Cited

U.S. PATENT DOCUMENTS

| | | | |
|---|---|---|---|
| 5,878,395 A | 3/1999 | Bennett | |
| 6,820,056 B1 | 11/2004 | Harif | |
| 6,975,944 B1 | 12/2005 | Zenhausern | |
| 7,489,303 B1* | 2/2009 | Pryor | ............................ 345/173 |
| 7,926,958 B2 | 4/2011 | Choi et al. | |
| 8,085,249 B2* | 12/2011 | Holtzman et al. | ............. 345/173 |
| 8,180,405 B2* | 5/2012 | Kim et al. | ...................... 455/566 |
| 8,223,242 B2* | 7/2012 | Ueda et al. | ............... 348/333.11 |

(Continued)

FOREIGN PATENT DOCUMENTS

| | | |
|---|---|---|
| CN | 101546244 A | 9/2009 |
| EP | 0999542 A1 | 5/2000 |

(Continued)

OTHER PUBLICATIONS

Pantech Sky IM-S410 Specification, User Manual, Feb. 2009.

*Primary Examiner* — Susan McFadden
(74) *Attorney, Agent, or Firm* — Jefferson IP Law, LLP

(57) ABSTRACT

A method and system is provided that controls an external output function of a mobile device according to control interactions received via the microphone. The method includes, activating a microphone according to preset optional information when the mobile device enters an external output mode, performing an external output operation in the external output mode, detecting an interaction based on sound information in the external output mode, and controlling the external output according to the interaction.

10 Claims, 7 Drawing Sheets

(56) References Cited

U.S. PATENT DOCUMENTS

| | | | |
|---|---|---|---|
| 8,326,328 B2 * | 12/2012 | LeBeau et al. | 455/456.4 |
| 8,340,319 B2 * | 12/2012 | Kinouchi et al. | 381/94.1 |
| 8,635,545 B2 * | 1/2014 | Kim et al. | 715/764 |
| 2005/0165609 A1 | 7/2005 | Zuberec et al. | |
| 2006/0044522 A1 | 3/2006 | Feliss et al. | |
| 2009/0033877 A1 | 2/2009 | Choi et al. | |
| 2009/0137275 A1 | 5/2009 | Amirmokri | |
| 2011/0151926 A1 * | 6/2011 | Kim et al. | 455/556.1 |
| 2011/0154249 A1 * | 6/2011 | Jang et al. | 715/781 |

FOREIGN PATENT DOCUMENTS

| | | |
|---|---|---|
| JP | 2005-208292 A | 8/2005 |
| KR | 10-2009-0013128 A | 2/2009 |
| KR | 10-2009-0036227 A | 4/2009 |
| KR | 10-2009-0043240 A | 5/2009 |
| KR | 10-2009-0076096 A | 7/2009 |

\* cited by examiner

METHOD AND SYSTEM FOR CONTROLLING EXTERNAL OUTPUT OF A MOBILE DEVICE

PRIORITY

This application claims the benefit under 35 U.S.C. §119(a) of a Korean patent application filed on Dec. 18, 2009 in the Korean Intellectual Property Office and assigned Serial No. 10-2009-0127136, the entire disclosure of which is hereby incorporated by reference.

BACKGROUND OF THE INVENTION

1. Field of the Invention

The present invention relates to electronic systems. More particularly, the present invention relates to a method and system that can control screen data output from a projector module installed as a component of a mobile device, according to a microphone-based input interaction.

2. Description of the Related Art

With the development of digital technology, a variety of mobile devices have been released that can perform communication and process a user's information while moving. Examples of the mobile devices are a mobile communication device, a Personal Digital Assistant (PDA), an electronic organizer, etc. These mobile devices output screen data on their display units. In general, the display unit provided as a component of the mobile devices is relatively small because the mobile devices are manufactured small.

Frequently, a user desires to show information to other people via the display unit of his/her mobile device. In that case, the user has difficulty viewing the information together with other people because the display unit is small. To address this problem, in recent years, the mobile devices have been developed that are equipped with a TeleVision (TV)-Out function that can output information from the mobile devices to an external display system, so that many people can view the information. However, to this end, the mobile devices require an additional large display system and a connection thereto via an additional connector.

To address the problem of requiring the additional large display system, the mobile devices have been developed that have a projection function that can project a large image onto an external screen, for example. Herein, the projection function may be implemented with a projector unit. In that case, the mobile device can output screen data on an external screen, such as a wall, floor, etc., via the projector unit. A mobile device with a projection function can project screen data, appearing on the display unit, onto an external screen.

The mobile device with a projector unit can be controlled by a wireless control unit that is separate from the mobile device, or by a mechanical force applied to a control unit (e.g., a button, a touch screen, or the like) installed as a component of the mobile device.

In order to control the mobile device with a projector unit, when a user applies a mechanical touch to the body of the mobile device, the mobile device may be shaken. When the mobile device outputting screen data to the external screen in a user's set direction and angle is shaken, the screen data is also shaken and varies its position on the external screen. For example, when a shake occurs while the mobile device is projecting a presentation or a movie onto an external screen, the user must operate the mobile device to correct for the shake. This may cause the disturbance in the presentation or a disturbance in an appreciation of the movie. The conventional mobile device with a projection function requires the user to re-adjust the position of the mobile device or re-set the options of the projection function in order to correct for the shake.

In addition, when the mobile device employs the wireless control unit, the user must also carry the wireless control unit.

SUMMARY OF THE INVENTION

An aspect of the present invention is to address at least the above-mentioned problems and/or disadvantages and to provide at least the advantages described below. Accordingly, an aspect of the present invention is to provide a method and system that can control a mobile device with a projector module so that the mobile device can control the output of screen data output to an external screen and the input for controlling the screen data.

Another aspect of the present invention is to provide a method and system that can simply and efficiently control the screen data, output from a projector module installed as a component of a mobile device, without mechanically touching the mobile device.

Yet another aspect of the present invention is to provide a method and system that can control screen data output from a projector module installed as a component of a mobile device, according to microphone-based input interactions.

In accordance with an aspect of the invention, a method for controlling an external output of a mobile device is provided. The method includes, activating a microphone according to preset optional information when the mobile device enters an external output mode, performing an external output operation in the external output mode, detecting an interaction based on sound information in the external output mode, and controlling the external output according to the interaction.

In accordance with another aspect of the invention, a mobile device is provided. The mobile device includes, a projector module for outputting screen data from the mobile device to an external screen, a storage unit for storing keyword information and optional information related to an external output function of the mobile device, a microphone for receiving sound information-based interactions in an external output mode, and a controller for detecting the sound information-based interactions via the microphone in the external output mode. The controller also controls a function for an external output corresponding to the optional information and keyword information. The external output mode is operated based on the projector module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
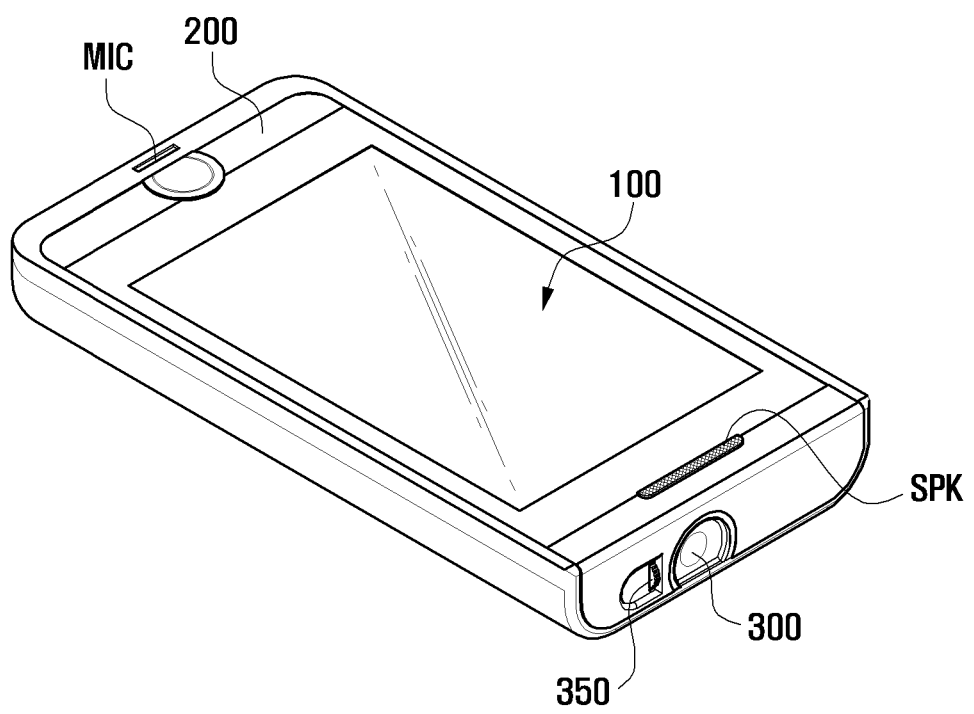
FIG. 1 illustrates a bar type mobile device having a full touch screen, according to an exemplary embodiment of the present invention.

The following description with reference to the accompanying drawings is provided to assist in a comprehensive understanding of exemplary embodiments as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining the exemplary embodiments of the present invention, terminologies will be defined that are used in the present description below. The terms or words described in the present description and the claims should not be limited by a general or lexical meaning, and instead should be analyzed as a meaning and a concept through which the inventor defines and describes the invention, to comply with the idea of the invention. Therefore, one skilled in the art will understand that the exemplary embodiments of the present invention disclosed in the description and illustrated in the drawings are only preferred embodiments. Accordingly, there may be various modifications, alterations, and equivalents thereof to supplement or replace the exemplary embodiments of the present invention at the time of filing this application.

Exemplary embodiments of the present invention relate to a method and system for controlling an external output of a mobile device with a projector unit. In particular, the exemplary embodiments of the present invention relate to a method and system that can control an external output function of the mobile device, according to an interaction received by a microphone, when the mobile device outputs screen data to an external screen through the projector unit.

The method and system can receive control interactions via a microphone, regardless of a user's environment (e.g., a dark or bright place), when a mobile device outputs screen data, and can then control the external output of the mobile device, according to the received control interactions. The method and system can recognize audio information-based interactions, such as a user's voice interaction or a blow interaction, via the microphone. The method and system can control screen data that is being output to an external screen, according to interactions received by the microphone, irrespective of a user's environment.

The mobile device of an exemplary embodiment of the present invention includes a projector module, a microphone, and a controller. The microphone serves to recognize a user's control interactions while the projector module of the mobile device is outputting screen data onto an external screen. The controller analyzes the interactions transferred from the microphone and performs a controlling operation corresponding thereto. In an exemplary embodiment of the present invention, the microphone may be implemented with an internal microphone installed as a component of the mobile device or an external microphone installed as a component of external devices, such as a Bluetooth headset, etc.

The following description illustrates the configuration of the mobile device with a projector module according to an exemplary embodiment of the present invention. It should be understood that the present invention is not limited to the exemplary embodiments. It will be noted that there may be many modifications from the exemplary embodiments described herein.

Figure 2:
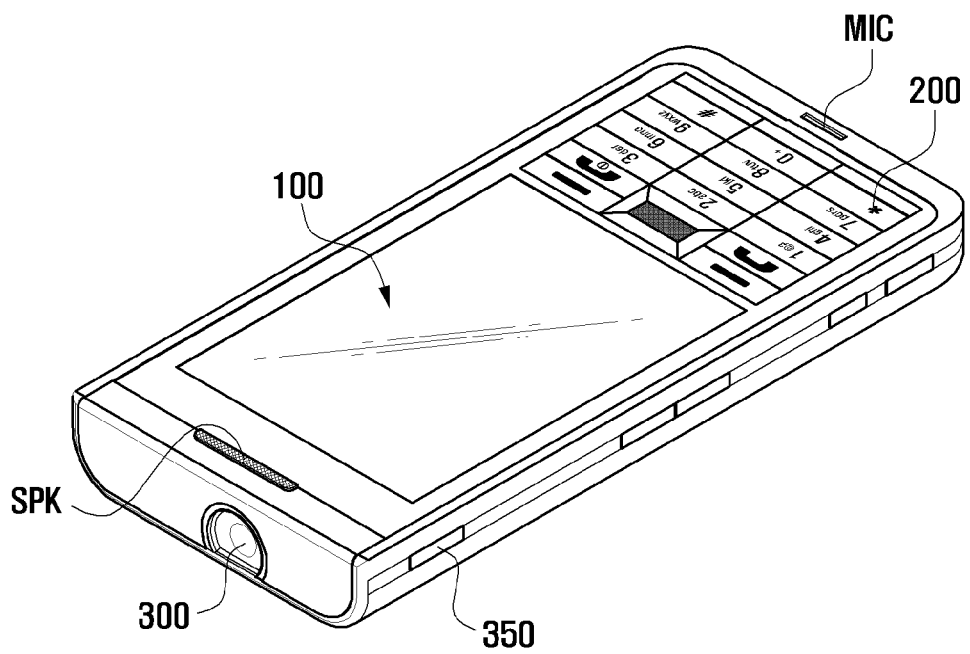
FIG. 2 illustrates a bar type mobile device having a display unit and an input unit, according to an exemplary embodiment of the present invention.

FIGS. 1 and 2 illustrate exemplary implementations of the mobile device according to exemplary embodiments of the invention. More specifically, FIG. 1 illustrates a bar type mobile device having a full touch screen, according to an exemplary embodiment of the present invention, and FIG. 2 illustrates a bar type mobile device having a display unit and an input unit.

Referring to FIGS. 1 and 2, the mobile device includes a display unit 100 for displaying screen data according to the execution of a corresponding function, an input unit 200 for creating a user's input signals, a projector module 300 for enlarging and projecting screen data onto an external screen, a focus control unit 350 for controlling the focus of the projector module 300, a speaker SPK for outputting various types of audio signals according to the execution of a corresponding function, a microphone MIC for receiving external audio signals, such as a user's voice, etc.

In an exemplary embodiment of the present invention, the microphone receives a user's voice or a blow from the user while the mobile device is outputting screen data onto an external screen via the projector module 300. The microphone may be implemented with an internal microphone installed as a component of the mobile device or an external microphone installed as a component of an external device.

Although, in an exemplary embodiment of the present invention, the microphone is installed as a component of the mobile device as shown in FIGS. 1 and 2, it should be understood that its installation location is not limited to these exemplary embodiments. It can also be installed at other locations of the mobile device in order to properly control the external output of the mobile device, depending on the type of the mobile device.

In addition, although the mobile devices shown in FIGS. 1 and 2 are implemented to include one microphone, respectively, it should be understood that the invention is not limited to these exemplary embodiments. For example, the mobile device may be implemented without an internal microphone. In that case, the mobile device is operated via an external microphone installed as a component of an external device. In another exemplary embodiment of the present invention, the mobile device can be implemented with a number of microphones. For example, as shown in FIGS. 1 and 2, the mobile device includes at least two or more microphones, which are referred to as a multi-microphone. If the mobile device is implemented with two microphones, they may be located in the top and bottom or the right and left with respect to the front side. Likewise, if the mobile device is implemented with four microphones, they may be located in the top, bottom, right, and left.

In another exemplary embodiment of the present invention, the microphone MIC can be replaced with or supplemented by a voice recognition module that has the same function as the microphone MIC.

As described above, the mobile device can respond a user's interactions using the same or different types of microphones. For example, if the mobile device is implemented with two microphones located in the top and bottom, the mobile device can be set in such a way that a user's interactions are responded to differently from each other, respectively, so that the mobile device can output data corresponding to the different interactions. That is, although the top and bottom microphones receive and recognize the same voice, they can respond to a user's interactions that differ from each other and control functions corresponding to the different interactions, respectively.

In an exemplary embodiment of the present invention, although the mobile device with a projector module are described herein based on a bar type as shown in FIGS. 1 and 2, it will be appreciated that the present invention similarly applies to all types of mobile devices, for example, a folder type, a slide type, a flip-flop type, etc. The mobile device can be applied to all information communication devices, multimedia devices, and their applications, if they can control an external output function according to the operation of a microphone. For example, the mobile device can be applied to all types of mobile communication terminals that are operated according to communication protocols corresponding to a variety of communication systems and also to relatively small-sized devices, for example, a Portable Multimedia Player (PMP), a digital broadcast player, a Personal Digital Assistant (PDA), an audio player (e.g., a Moving Picture Experts Group (MPEG)-1 or MPEG-2 Audio Layer 3 (MP3) player), a mobile game player, a smart phone, etc. The mobile device can also be applied to relatively mid-sized and large-sized devices, for example, a TeleVision (TV) set, a Large Format Display (LFD), a Digital Signage (DS), a media pole, a personal computer, a laptop computer, etc.

Figure 3:
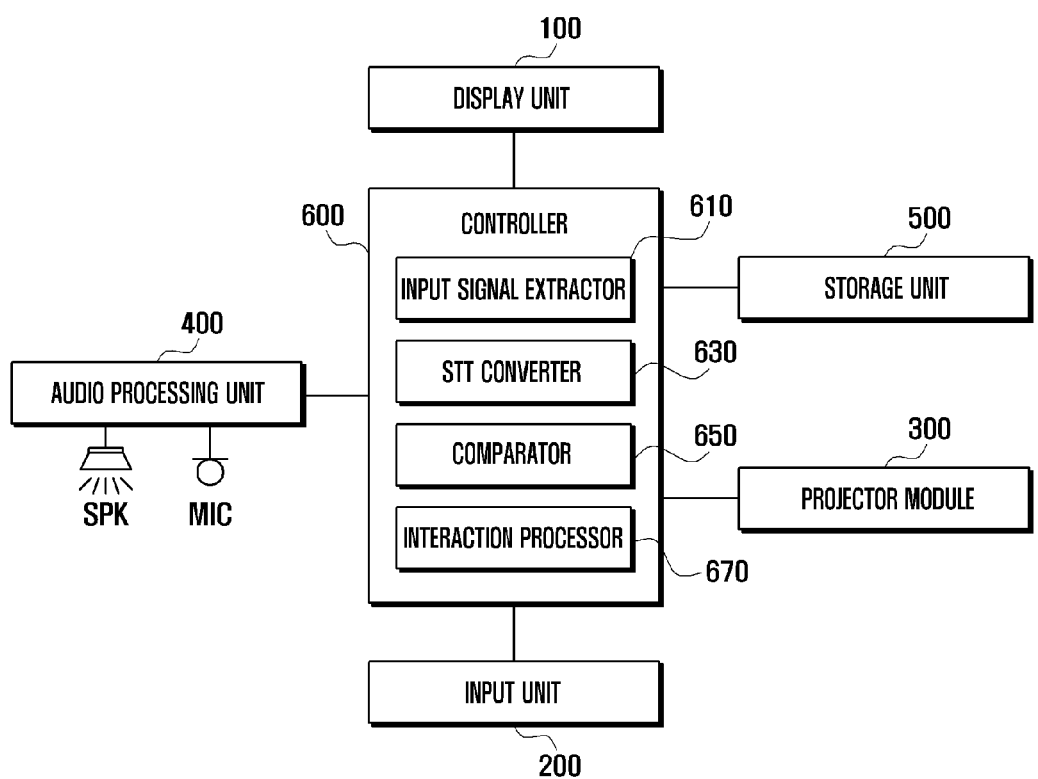
FIG. 3 illustrates a schematic block diagram of a mobile device according to an exemplary embodiment of the present invention.

The following description explains the elements of the mobile device with a projector module, referring to FIG. 3. FIG. 3 shows the mobile device with a projector module, including a microphone, i.e., an internal microphone, according to an exemplary embodiment of the present invention. In another exemplary embodiment of the present invention, the mobile device can be implemented without the internal microphone. In that case, the mobile device can employ its microphone function via an external device with a microphone, i.e., an external microphone, for example, a Bluetooth headset, a wired or wireless external microphone. When the mobile device of the invention is operated via an external device with a microphone, it can further include an interface for receiving audio signals from the external device.

FIG. 3 illustrates a schematic block diagram of a mobile device according to an exemplary embodiment of the present invention.

Referring to FIG. 3, the mobile device includes a display unit 100, an input unit 200, a projector module 300, an audio processing unit 400, a storage unit 500, and a controller 600.

The input unit 200 outputs input signals corresponding to numerical and text information, signals for setting functions of the mobile device, and control signals related to the function to the controller 600. The input unit 200 creates command signals related to the entire operation of the mobile device. The input unit 200 includes function keys and input keys for creating the signals. The function keys include direction keys, side keys, shortcut keys, etc., which are set to perform specific functions (e.g., a projection function). In addition, the input unit 200 may further include a focus adjustment unit for adjusting the focus of the projector module 300 as shown in FIGS. 1 and 2.

The input unit 200 may be implemented by one of a touch pad, a touch screen, a keypad of a general key arrangement (e.g., a 3×4 or 4×3 key arrangement), a QWERTY keypad, a dome key, or a combination thereof. In particular, the input unit 200 creates an input signal for executing a projection function and outputs the input signal to the controller 600. The input signal for executing a projection function may be a key signal created by operating the input unit 200. Alternatively, if the mobile device is equipped with a touch screen, the input signal for executing a projection function may be created by touching the touch screen.

The audio processing unit 400 includes a speaker SPK for reproducing audio signals from the mobile device, and a microphone MIC for receiving audio signals such as a user's voice. The audio processing unit 400 connects to the speaker SPK and the microphone MIC. The audio processing unit 400 converts audio signals, received by the microphone MIC, into digital data and then outputs the digital data to the controller 600. The audio processing unit 400 also receives audio signals from the controller 600 and outputs the audio signals via the speaker SPK. The audio processing unit 400 can also output various types of audio signals created in the mobile device, according to the user's selection. The audio signals include signals created as video or audio data is reproduced, a signal for generating an alarm sound according to the execution of the projection function, etc.

In an exemplary embodiment of the present invention, the audio processing unit 400 receives control interactions for controlling an external output function via the microphone MIC when the mobile device is operated in an external output mode. The audio processing unit 400 creates data from the control interactions and transfers the data to the controller 600. That is, the audio processing unit 400 receives a voice information-based interaction via the microphone MIC in an external output mode. The voice information-based interaction includes a voice interaction, based on a user's voice, and a blow interaction based on a user's blow.

When the mobile device is operated in an external output mode, the microphone MIC can be operated in an always-listening mode or normal-listening mode, under the control of the controller 600. The always listening mode refers to a mode where the mobile device turns on the microphone MIC so that the microphone MIC can receive a user's voice or blow when the mobile device is operated in an external output mode. The normal listening mode refers to a mode where the microphone MIC is turned from off to on or vice versa, according to a user's selection, when the mobile device is operated in an external output mode.

The display unit 100 outputs various types of screens when corresponding functions are performed in the mobile device. For example, the display unit 100 can display a booting screen, an idle screen, a menu screen, a list screen, a playback screen, application executing screens of the mobile device, etc. The display unit 100 displays screen data related to the states and operations of the mobile device. The display unit 100 can also display signals and color information output from the controller 600. The display unit 100 can be implemented with a Liquid Crystal Display (LCD), a Plasma Display Panel (PDP), a Light Emitting Diode (LED), an Organic LED (OLED), an Active Matrix OLED (AMOLED), or the like. If the display unit 100 is implemented with a touch screen, the touch screen can also serve as an input device. In that case, the mobile device according to the invention can be configured without the input unit 200.

In an exemplary embodiment of the present invention, when the mobile device is operated in an external output mode, i.e., when the mobile device performs a projection function, the display unit 100 displays screen data, output from the controller 600, or a virtual item based on a Graphic User Interface (GUI) for controlling the external output function. When the mobile device performs the projection function, the display unit 100 can display screen data that is identical to or differs from the screen data output to an external screen, according to the control of the controller 600. It is assumed that the screen data displayed on the display unit 100 is referred to as 'internal screen data' and the screen data displayed on the external screen is referred to as 'external screen data.' For example, the display unit 100 can display a GUI serving as a virtual item for controlling the external output function, on an image corresponding to the internal screen data, according to the control of the controller 600.

The storage unit 500 stores data created or used in the mobile device. The data refers to all data that are created by the mobile device or received from external systems (e.g., other external mobile devices, personal computers, etc.). Examples of the data are video data, audio data, broadcast data, photograph data, message data, text data, image data, etc. The storage unit 600 can store applications for executing corresponding functions in the mobile device. An example of the applications is the execution of a projection function in the mobile device. The storage unit 500 can store a virtual item for controlling a projection function when the projection function is activated. The storage unit 500 can also store software for controlling a function of screen data that the projector module 300 is currently outputting to an external screen.

The storage unit 500 stores the optional information for the external output function of the mobile device. The optional information includes receiving mode information, keyword information, etc. The receiving mode information is used to operate the microphone MIC when the mobile device is operated in an external output mode. The keyword is used to identify control interactions for controlling the external output.

The receiving mode information refers to information for setting the always listening mode and normal listening mode.

The keyword information refers to information about keywords for identifying a user's normal voice and a voice for controlling an external output. The keyword information includes a magic keyword and a command keyword. The magic keyword serves to activate an interaction receiving mode for controlling an external output when the mobile device is operated in an external output mode. The command keyword serves to identify a user's voice or blow received via the microphone MIC when the interaction receiving mode is activated according to the magic keyword. Table 1 is shown below as an example of the keyword information.

TABLE 1

| Keyword Info. | Commands | | Functions | |
|---|---|---|---|---|
| Magic Keyword | Magic | | Switch between activation and deactivation of interaction receiving mode | |
| Command keywords | Voice | Play | Playback | |
| | | Pause | Pause | |
| | | Next | Turn to next page/move channel | |
| | | Previous | Turn to previous page/move channel | |
| | | Forward | Fast forward | |
| | | Rewind | Rewind | |
| | | Vol. up | Volume increase | |
| | | Vol. down | Volume decrease | |
| | | Zoom in | Zoom in | |
| | | Zoom out | Zoom out | |
| | | Power on | Turn on an external output function | |
| | | Power off | Turn off an external output function | |
| | | | For one microphone | For two microphones |
| | | | MIC | 1$^{st}$ MIC / 2$^{nd}$ MIC |
| | Blow | $T_B < T$ | Pause | Pause / Playback |
| | | $T \le T_B$ | Playback | Turn to next page/move channel / Turn to previous page/move channel |
| | | $T_B < T$ $S_B < S$ | Pause | Playback / Pause |
| | | $T_B < T$ $S \le S_B$ | Playback | Turn to next page/move channel / Turn to previous page/move channel |
| | | $T \le T_B$ $S_B < S$ | Turn to next page/move channel | Fast forward / Rewind |
| | | $T \le T_B$ $S \le S_B$ | Turn to previous page/move channel | Volume increase / Volume decrease |

In Table 1, T denotes a preset reference time and S denotes a preset reference strength value.

As described in Table 1, the keyword information is divided into the magic keyword and the command keyword. The magic keyword refers to a command for activating an interaction receiving mode. In an interaction receiving mode, the mobile device can receive a voice or blow interaction for controlling screen data, output to an external screen via the projector module 300, when the mobile device is operated in an external output mode. That is, when the mobile device is operated in an external output mode and the microphone is also operated in an always listening mode, the mobile device can receive a user's normal voices, audio signals created when an application executes video data or audio data, and noise, via the microphone MIC. The user's normal voice refers to user's voice when it does not contain control commands. In an exemplary embodiment of the present invention, the mobile device ignores the audio signals, input to the microphone MIC before activating an interaction receiving mode by the magic keyword. That is, the mobile device does not process such audio signals as an interaction for controlling an external output. The mobile device continues, however, to determine whether an audio signal corresponding to a preset magic keyword (e.g., the 'Magic' described in Table 1) is received via the microphone MIC.

The command keywords refer to commands for controlling an external output function based on audio signals that are input when an interaction receiving mode is activated according to the magic keyword. The commands serving as the command keyword are divided into the voice command group and blow command group as described in Table 1. It should be understood that one command in the command keyword can be set to perform various types of functions according to the operation modes of the microphone MIC.

The commands available for the voice commands, as described in Table 1, serve to perform the following functions: 'Play', 'Pause', 'Next', 'Next', 'Previous', 'Forward', 'Rewind', 'Volume up', 'Volume down', 'Zoom in', 'Zoom out', 'Power on', 'Power off', etc. The voice commands and the functions corresponding thereto, as default values, can be set to be performed in the mobile device when they are manufactured. Alternatively, the voice commands can also be set in the mobile device according to a user's selection.

The commands available for the blow commands can be classified as shown in Table 1, based on preset reference values.

When the mobile device employs one microphone, the blow commands can set their functions based on at least one of reference values, i.e., a preset length of time of receiving a blow T (referred to as a 'reference time T') and a preset reference strength value of receiving a blow S (referred to as a 'reference strength value S'). In that case, a length of time of receiving a blow $T_B$ (referred to as a 'blow receiving time $T_B$') is set as follows. Here $T_B$ is less than T or $T_B$ is equal to or greater than T, for example. Likewise, a strength value of receiving a blow $S_B$ (referred to as a 'blow receiving strength value $S_B$') is set as follows. Here $S_B$ is less than S or $S_B$ is equal to or greater than S, for example. Alternatively, the blow commands can also set their functions based on a combination of the 'reference time T' and the 'reference strength value S'. That is, a command can be set as follows. Here, '$T_B$ is less than T and $S_B$ is less than S,' '$T_B$ is less than T and $S_B$ is equal to or greater than S,' '$T_B$ is equal to or greater than T and $S_B$ is less than S' and '$T_B$ is equal to or greater than T and $S_B$ is equal to or greater than S.' The blow commands and the functions corresponding thereto can be set to be performed in the mobile device, based on at least one of the reference time T and the reference strength value S, as a default value, when they are manufactured. Alternatively, the blow commands can also be set in the mobile device according to a user's selection.

Although Table 1 shows an example when the voice commands are managed using one microphone, it should be understood that they can also be set using two microphones. In addition, although Table 1 describes an example using one or two microphones, it should be understood that the invention is not limited to these exemplary embodiments. For example, the mobile device can also be implemented with two or more microphones. In that case, the microphones may be achieved by a combination of internal microphones and external microphones.

It should be understood that the keyword information, the commands and the functions corresponding to the commands, described in Table 1, can be provided to mobile devices, as default values, and they can be edited, such as modification, deletion, and addition, according to a user's settings.

The storage unit 500 adds display information to optional information and stores it. The display information sets display modes of a virtual item for controlling a function of screen data that is output to an external screen according to the execution of an application. The display information is used to display at least one of the commands set by the user, which can be executed while a corresponding application is running, on the screen data displayed on the external screen, referred to as external screen data, and/or the screen data displayed on the display unit 100, referred to as internal screen data, when an interaction receiving mode is activated according to the magic keyword. The command refers to executable command information and can be displayed on the internal screen data and/or external screen data in the format of pop-up window. In addition, the storage unit 500 may further add a display mode of execution information, stating that a corresponding function is controlled and executed according to a particular command, to the display information as well as the display information for showing a display mode of executable command information, and stores it.

The storage unit 500 includes at least one or more buffers that temporarily store data generated while the mobile device is executed. For example, the storage unit 500 buffers screen data that is output to an external screen via the projector module 300. In addition, the storage unit 500 also buffers audio signals received via the microphone MIC when the mobile device is operated in an external output mode.

The storage unit 500 may also be implemented with all types of recoding media that can be installed inside or outside the mobile device, for example, a smart card. The storage unit 500 may include Random Access Memory (RAM), Read Only Memory (ROM), or flash memory, or a combination thereof. The storage unit 500 may include one or two integrated memory, for example, Multi-Chip Package (MCP) memory, etc.

The projector module 300 can be internally or externally installed as a component of the mobile device. The projector module 300 outputs screen data, provided by the controller 600, to an external screen via the lens. The projector module 300 can project screen data processed by the controller 600 to an external screen without distortion.

The controller 600 controls the operations of the mobile device and also signals flowing among the elements in the mobile device. Examples of the elements are the input unit 200, audio processing unit 400, display unit 100, storage unit 500, projector module 300, etc.

The controller 600 controls an external output via the projector module 300. The controller 600 processes the audio signals, received via the microphone MIC, as interactions for controlling functions of the mobile device. The controller 600 controls an external output function according to a received interaction. That is, the controller 600 can control an external output function according to an interaction received via the microphone MIC. When the mobile device enters an external output mode, the controller 600 controls the microphone based on the reception mode information contained in the optional information. When the mobile device is operated in an external output mode, the controller 600 analyzes the audio signals received via the microphone. When the analyzed audio signal corresponds to preset keyword information, the controller 600 creates an interaction corresponding to the keyword information and controls an external output function according to the interaction.

The controller 600 outputs the screen data via the display unit 100, which is called internal screen data, and also the screen data via the projector module 300, which is called external screen data, when the mobile device performs the projection function. In particular, when the projector module 300 outputs the screen data of a particular application on an external screen, the controller 600 may turn off the display unit 100 or may not display the internal screen data on the display unit 100. Alternatively, the controller 600 can display the same screen data on both the display unit 100 and the external screen. In that case, the internal screen data is identical to the external screen data. In addition, the controller 600 can also display different screen data on the display unit 100 and the external screen. In that case, the internal screen data differs from the external screen data. For example, the internal screen data as a User Interface (UI) provided by the mobile device can be displayed on the entire screen. The external screen data can be displayed in such a way that corresponding screen data, reproduced/executed according to an application, is enlarged and then output to an external screen.

As described above, the controller 600 can control functions of the mobile device in an external output mode. To this end, the controller 600 further includes an input signal extractor 610, a Speech-To-Text (STT) converter 630, a comparator 650, and an interaction processor 670.

The input signal extractor 610 extracts an input signal from an interaction that is input to the microphone and transferred from the audio processing unit 400. The input signal may be an audio signal corresponding to a voice or a blow. The input signal extractor 610 identifies whether the input signal corresponds to a voice-based interaction or a blow-based interaction and outputs the identified result.

The STT converter 630 performs an audio signal, extracted by the input signal extractor 610, to a text. To this end, the STT converter 630 includes an STT converting unit for converting an audio signal to a text and a sound pressure converting unit for converting an audio signal to a sound pressure signal. When the audio signal, extracted by the input signal extractor 610, corresponds to a voice-based interaction, the STT converter 630 converts the audio signal to a text signal via the SST converting unit. Likewise, when the audio signal, extracted by the input signal extractor 610, corresponds to a blow-based interaction, the STT converter 630 converts the audio signal to a sound pressure signal via the sound pressure converting unit. The STT converter 630 transfers the converted text signal and the converted sound pressure signal to the comparator 650.

The comparator 650 compares the text of the text signal, transferred from the STT converter 630, with the voice commands in the preset keyword information described in Table 1. Likewise, the comparator 650 compares the sound pressure signal, transferred from the STT converter 630, with the blow commands in the preset keyword information described in Table 1. The comparator 650 transfers the comparison results to the interaction processor 670. The comparator 650 can compare a text signal or sound pressure signal, received before the interaction receiving mode is activated, with the magic keyword in the keyword information. Likewise, the comparator 650 can compare a text signal or sound pressure signal, received after the interaction receiving mode is activated, with the command keyword (i.e., a voice command or blow command) in the keyword information. The comparator 650 outputs the result information, according to the comparison whether the text signal or sound pressure signal matches a corresponding keyword in the keyword information, to the interaction processor 670.

The interaction processor 670 processes an input signal-based interaction received via the microphone, according to the comparison result of the comparator 650. When the text signal or sound pressure signal does not match the keyword information, the interaction processor 670 ignores the input signal received via the microphone, and skips the creation of interaction by the input signal. On the contrary, when the text signal or sound pressure signal matches the keyword information, the interaction processor 670 creates an interaction for executing a function to which the matched command is mapped and controls an external output function according to the interaction.

As described above, when the mobile device performs an external output function via the projector module 300, the controller 600 receives an interaction, input to the microphone, from the audio processing unit 400 and extracts an input signal according to the interaction via the input signal extractor 610. The input signal may be an audio signal corresponding to a voice or a blow. The controller 600 identifies whether the interaction is a voice-based interaction or a blow-based interaction. When the mobile device is operated in an external output mode, the controller 600 receives a user's input signal according to a microphone-based interaction and determines whether an interaction receiving mode is activated or deactivated. When an interaction receiving mode is deactivated, the controller 600 compares the input signal with the magic keyword. When the controller 600 ascertains that the input signal matches the magic keyword, it activates the interaction receiving mode and waits for the reception of an interaction for controlling an external output. On the contrary, when an interaction receiving mode is activated, the controller 600 compares the input signal with the command keyword. When the controller 600 ascertains that the input signal matches the command keyword, it controls an external output based on a corresponding command.

When the controller 600 ascertains that the interaction is a voice interaction, the STT converter 630 converts the audio signal, extracted by the input signal extractor 610, into a text signal and creates a text. This can be achieved by the STT converting function. The controller 600 controls the comparator 650 to compare the created text with the keyword information stored in the storage unit 500. The controller 600 compares the interaction, received before the interaction receiving mode is activated, with the magic keyword in the keyword information. On the contrary, the controller 600 compares the interaction, received after the interaction receiving mode is activated, with the command keyword in the keyword information.

The controller 600 processes a corresponding interaction according to the comparison result of the comparator 650. That is, when the text does not match the keyword information, the interaction processor 670 ignores the input signal and skips the creation of interaction. On the contrary, when the text matches the keyword information, the interaction processor 670 creates a control interaction according to a voice command matching the keyword information and controls an external output function according to the created control interaction.

Likewise, when the controller 600 ascertains that the interaction is a blow interaction, the STT converter 630 converts the audio signal, extracted by the input signal extractor 610, into a sound pressure signal. This can be achieved by the audio signal-to-sound pressure signal converting function. The controller 600 controls the comparator 650 to compare the sound pressure signal with the keyword information stored in the storage unit 500. The controller 600 compares the interaction, received before the interaction receiving mode is activated, with the magic keyword in the keyword information. On the contrary, the controller 600 compares the interaction, received after the interaction receiving mode is activated, with the command keyword in the keyword information.

The controller 600 processes a corresponding interaction according to the comparison result of the comparator 650. That is, when the sound pressure signal does not match the keyword information, the interaction processor 670 ignores the input signal and skips the creation of interaction. On the contrary, when the sound pressure signal matches the keyword information, the interaction processor 670 creates a control interaction according to a blow command matching the keyword information and controls an external output function according to the created control interaction.

When the controller 600 controls the interaction receiving mode to be activated or deactivated according to the procedure described above, it can display executable command information on at least one of the internal screen data and the external screen data based on the display information in the optional information. In addition, when the controller 600 controls an external output function according to an interaction that is received after the executable command information is displayed in the activated interaction receiving mode, it can also display execution information stating that a function corresponding to at least one of the internal screen data and the external screen data is executed based on the display information.

The controller 600 controls an external output according to the operation modes of the microphone MIC. That is, when the mobile device employs a single microphone MIC, the controller 600 processes the audio signal input to the single microphone MIC as an interaction as described in Table 1 and controls an external output function based on the interaction. When the mobile device employs a number of microphones, the controller 600 processes the audio signals input to corresponding microphones as interactions as described in Table 1 and controls an external output function based on the interactions.

For example, the controller 600 can distinguish between an interaction according to an audio signal input to a first microphone and an interaction according to an audio signal input a second, and can then process them as described in Table 1. When the user inputs a blow to the first microphone for a blow receiving time TB less than the reference time T, the controller 600 can control a pause function according to the blow interaction, referring to Table 1. Likewise, when the user inputs a blow to the second microphone for a blow receiving time TB less than the reference time T, the controller 600 can control a playback function according to the blow interaction. As such, although the user applies the same input signal to the mobile device, the mobile device can perform different functions according to which the microphones receive the input signal.

The operations of the controller 600 will be described in detail, later, referring to the accompanying drawings. The controller 600 can control the entire operation related to the external output function according to the operation of the projector module 300. It should be understood that the control operation of the controller 600 can also be implemented with software having an algorithm.

In an exemplary embodiment of the present invention, although FIGS. 1 and 3 schematically show the configuration of the mobile device for the sake of convenience, it should be understood that the invention is not limited to these exemplary embodiments.

The controller 600 may include a baseband module for allowing the mobile device to provide a mobile communication service. In that case, the mobile device may further include an RF communication module for establishing a communication channel with a mobile communication system and allowing the mobile device to communicate with the mobile communication system. Although it is not shown in FIGS. 1 to 3, the mobile device may further include a location information receiver for acquiring location information about the mobile device, such as a Global Positioning System (GPS) module, a camera module for capturing still images or moving images, a camera module for supporting a video call service, a Bluetooth communication module for supporting Bluetooth communication, interface units for transmitting and receiving data in wired or wireless mode of the mobile device, an Internet communication module for supporting an Internet function via the Internet, a digital broadcast module for receiving and reproducing digital broadcasts, etc. In another embodiment, it will be appreciated that, according to the purposes, the mobile device may be implemented by omitting a particular element from the configuration shown in FIGS. 1 to 3 or replacing it with other elements.

The foregoing description explained the configuration of the mobile device according to exemplary embodiments of the present invention. The following description explains the operations of the mobile device with a projection function and the method for controlling the external output function based on the projector module 300 with reference to the accompanying drawings. It should be, however, understood that the invention is not limited to the following exemplary embodiments. It will be noted that there may be many modifications from the exemplary embodiments.

Figure 4:
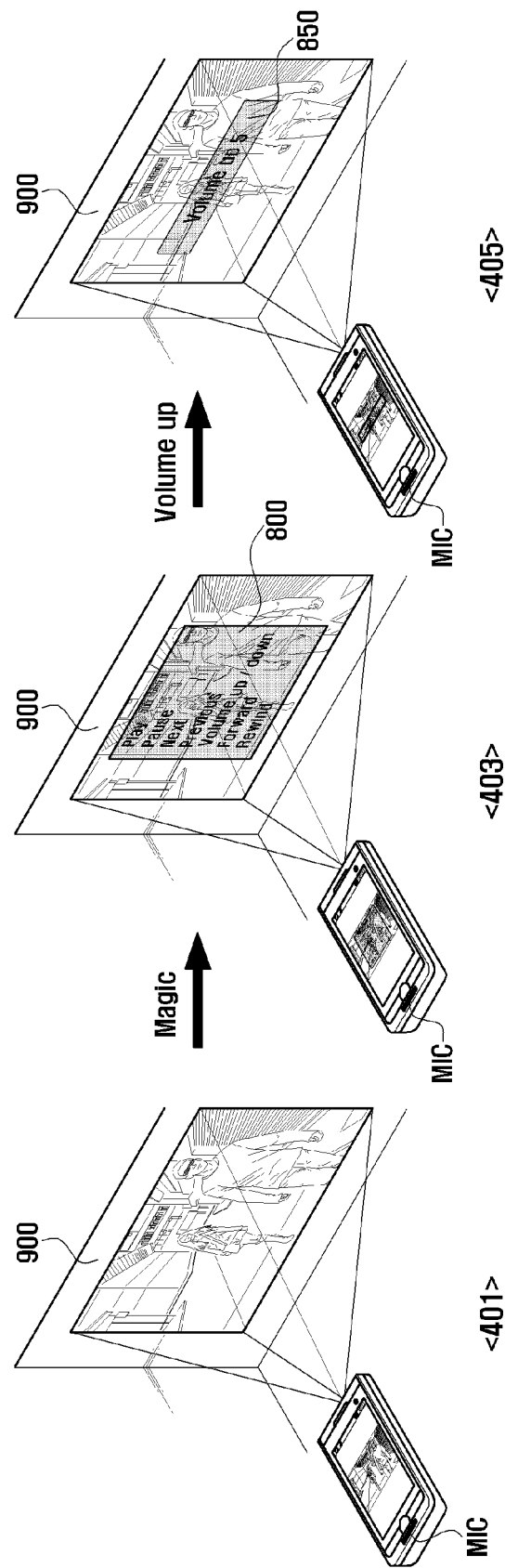
FIG. 4 illustrates views that describe methods for controlling an external output of a mobile device, based on voice interactions, according to an exemplary embodiment of the present invention.

FIG. 4 illustrates views that describe methods for controlling an external output of a mobile device, based on voice interactions, according to an exemplary embodiment of the present invention.

Referring to FIG. 4, diagram 401 shows a state where the mobile device outputs screen data to an external screen 900 via the projector module 300. When a user operates the mobile device to execute an application, the mobile device outputs screen data onto the external screen 900 via the projector module 300. The external screen 900 refers to a screen on which the projector module 300 projects the screen data. Examples of the external screen 900 are a component (e.g., a white screen, etc.) installed to an external system, a wall, a floor, etc. It will be appreciated that the external screen 900 may be any type of object that the projector module 300 can project the screen data onto and display the screen data. The screen data may be dynamic screen data reproduced by a playback application (e.g., a moving image playback application, a digital broadcast playback application, etc.). The screen data may also be static screen data displayed by a viewer application (e.g., a text viewer application, an image viewer application, etc.).

While the screen data is being displayed on the external screen 900 as shown in diagram 401, the user can create an interaction to control the screen data. For example, the user can input his/her voice into an internal microphone of the mobile device or an external microphone installed as a component of an external device (e.g., a Bluetooth headset, etc.) when the mobile device outputs the screen data onto the external screen 900 as shown in diagrams 401 and 403. Diagrams 401 and 403 show examples where the user inputs his/her voice corresponding to a keyword (e.g., 'Magic' described in Table 1) for activating an interaction receiving mode. In an exemplary embodiment of the present invention, the keyword for activating an interaction receiving mode can be set to a blow keyword corresponding to the condition '$T_B<T$ and $S \le S_B$.' In that case, the user can activate an interaction receiving mode, by inputting a blow into the microphone, thereby satisfying the condition '$T_B<T$ and $S \le S_B$.'

The controller 600 receives an input signal corresponding to the user's voice via the microphone and identifies whether it corresponds to a voice interaction or a blow interaction. Diagrams 401 and 403 show an example where the input signal is a voice interaction. The controller 600 converts the input signal of the voice interaction into a text via a STT conversion and compares the text with a magic keyword in the keyword information.

When the controller 600 ascertains that the text matches a magic keyword, it activates an interaction receiving mode and then outputs executable command information 800 as shown in diagram 403. The executable command information 800 refers to information about commands that can be executed on the current output. When the controller 600 activates an interaction receiving mode, it outputs the executable command information 800 on at least one of the internal screen data and the external screen data, referring to preset optional information (i.e., display information). It should be understood that the executable command information 800 may not be displayed according to a user's settings.

After that, the user can create an interaction for controlling an external output function, referring to the executable command information 800 output as shown in diagram 403. For example, the user can input his/her voice to the internal microphone or the external microphone. Diagram 403 shows an example where the user inputs his/her voice, corresponding to a keyword (e.g., volume increase) for controlling an external output function, to the microphone.

The controller 600 receives an input signal corresponding to the user's voice via the microphone and identifies whether the input signal corresponds to a voice interaction or a blow interaction. Diagram 403 shows an example where the input signal is a voice interaction. The controller 600 converts the input signal of the voice interaction into a text via a STT conversion and compares the text with a command keyword (i.e., a voice keyword) in the keyword information.

When the controller 600 ascertains that the text matches a particular keyword of the command keywords, it controls a function corresponding to the matched command (e.g., volume increase) in the keyword commands as shown in diagram 405. For example, the controller 600 can increase/decrease in the audio volume (e.g., volume increase according to the command), based on the recognized command, while the screen data is being output. The controller 600 can also control various functions described in Table 1, according to corresponding recognized commands.

When the controller 600 controls a function based on the commands, it can output execution information 850 stating that a control function is performed on the current external output as shown in diagram 405. When the controller 600 controls the output of the execution information 850, it can output the execution information 850 on at least one of the internal screen data and the external screen data, referring to preset optional information (i.e., display information). It should be understood that the execution information 850 may not be displayed according to a user's settings. The execution information 850 may be displayed, as an icon or a text, on at least one of the internal screen data and the external screen data, for a preset period of time or during the function control operation. That is, the execution information may be displayed on the internal screen data or the external screen data until a preset time period has elapsed, and then removed therefrom. In addition, the execution information may be displayed on the internal screen data or the external screen data before a corresponding function is released, and then removed therefrom.

After controlling a particular function for the external output as shown in diagram 405, the controller 600 can continue controlling another function. The user can re-call the executable command information 800 by inputting his/her voice corresponding to a magic keyword as shown in diagram 403 or can directly control another function by inputting his/her voice (i.e., a voice interaction or a blow interaction) corresponding to a command keyword as shown in diagram 405. Therefore, the controller 600 can compare the input signals, received when the interaction receiving mode has been activated as shown in diagram 401, with both the magic keywords and the command keywords. After that, the controller 600 can perform a corresponding function according to the matched keyword.

On the contrary, when a corresponding function for the external output has been controlled as shown in diagram 405, the user may continue viewing corresponding screen data. When the controller 600 does not receive a new input signal via the microphone within a preset time period, the controller 600 can switch the interaction reception mode from the activation state to the deactivation state.

Figure 5:
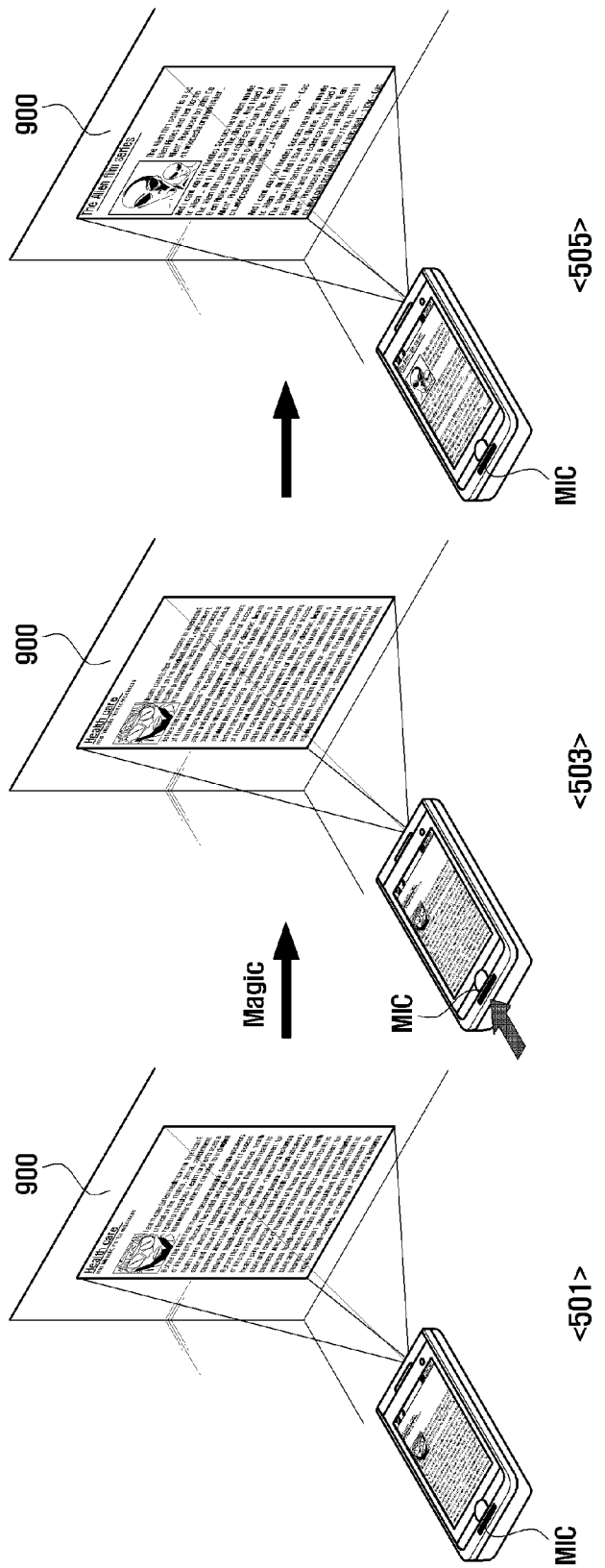
FIG. 5 illustrates views that describe methods for controlling an external output of a mobile device, based on blow interactions, according to an exemplary embodiment of the present invention.

FIG. 5 illustrates views that describe methods for controlling an external output of a mobile device, based on blow interactions, according to an exemplary embodiment of the present invention.

Referring to FIG. 5, diagram 501 shows a state where the mobile device outputs screen data to an external screen 900 via the projector module 300. When a user operates the mobile device to execute an application, the mobile device outputs screen data onto the external screen 900 via the projector module 300. The screen data may be dynamic screen data reproduced by a playback application or static screen data displayed by a viewer application.

While the screen data is being displayed on the external screen 900 as shown in diagram 501, the user can create an interaction to control the screen data. For example, the user can input his/her voice into an internal microphone of the mobile device or an external microphone installed as a component of an external device when the mobile device outputs the screen data onto the external screen 900 as shown in diagrams 501 and 503. Diagrams 501 and 503 show examples where the user inputs his/her voice corresponding to a keyword (e.g., 'Magic' described in Table 1) for activating an interaction receiving mode. In an exemplary embodiment of the present invention, the keyword for activating an interaction receiving mode can be set to a blow keyword corresponding to the condition '$T_B < T$ and $S \leq S_B$.' In that case, the user can activate an interaction receiving mode, by inputting a blow into the microphone, satisfying the condition '$T_B < T$ and $S < S_B$.'

The controller 600 receives an input signal corresponding to the user's voice via the microphone and identifies whether it corresponds to a voice interaction or a blow interaction. Diagrams 501 and 503 show an example where the input signal is a voice interaction. The controller 600 converts the input signal of the voice interaction into a text via a STT conversion and compares the text with a magic keyword in the keyword information.

When the controller 600 ascertains that the text matches a magic keyword, it activates an interaction receiving mode. Although it is not shown in FIG. 5, the controller 600 can output the executable command information 800 on at least one of the internal screen data and the external screen data, in the activated interaction receiving mode, as shown in diagram 403 of FIG. 4.

After an interaction corresponding to the magic keyword is created and an interaction receiving mode is activated, the user can create another interaction for controlling an external output function as shown in diagram 503. For example, the user can input his/her voice to the internal microphone of the mobile device or the external microphone of an external device. Diagram 503 shows an example where the user inputs a blow, corresponding to a keyword (e.g., $T < T_B$ and $S \leq S_B$) for controlling an external output function, to the microphone.

The controller 600 receives an input signal corresponding to the user's blow via the microphone and identifies whether the input signal corresponds to a voice interaction or a blow interaction. Diagram 503 shows an example where the input signal is a blow interaction. The controller 600 converts the input signal of the blow interaction into a sound pressure signal via a sound pressure conversion and compares the sound pressure signal with a command keyword (i.e., a blow keyword) in the keyword information.

When the controller 600 ascertains that the sound pressure signal matches a particular keyword of the command keywords, it controls a function corresponding to the matched command (e.g., switch to a previous page) as shown in diagram 505. For example, the controller 600 can control the page switch for the screen data that is being output (e.g., movement to a previous page according to the command), based on the recognized command. The controller 600 can also control various functions described in Table 1, according to corresponding recognized commands.

In addition, although it is not shown in FIG. 5, the controller 600 can output the execution information 850 on at least one of the internal screen data and the external screen data, as shown in diagram 405 of FIG. 4, when the controller 600 controls a function based on the command.

After controlling a particular function for the external output as shown in diagram 505, the controller 600 can continue controlling another function. The user can call the executable command information 800 by inputting his/her voice corresponding to a magic keyword or can directly control another function by inputting his/her voice (i.e., a voice interaction or a blow interaction) corresponding to a command keyword. Therefore, the controller 600 can compare the input signals, received when the interaction receiving mode has been activated, with both the magic keywords and the command keywords. After that, the controller 600 can perform a corresponding function according to the matched keyword.

On the contrary, when a corresponding function for the external output has been controlled as shown in diagram 505, the user may continue viewing corresponding screen data. When the controller 600 does not receive a new input signal via the microphone within a preset time period, it can switch the interaction reception mode from the activation state to the deactivation state.

Meanwhile, FIG. 5 shows an example where the mobile device controls an external output function according to a command keyword based on a blow interaction that is input via the internal microphone. In an exemplary embodiment of the present invention, the mobile device can be set in such a way that a blow interaction can perform only one particular function. That is, setting a command keyword according to a blow interaction described in Table 1 is omitted, all types of blow interactions can be set to directly perform one particular function.

Although it is not shown in FIG. 5, the mobile device can be operated via at least two or more microphones. For example, when the mobile device includes two microphones, such as first and second microphones, the first and second microphones may be installed at the left and right sides, as shown in FIG. 1, with respect to the front of the mobile device. In that case, the mobile device can be set to perform one function or at least one function according to a command keyword, by microphones, with respect to blow interactions.

The mobile device can omit the process of setting a command keyword according to blow interactions. However, the mobile device can set different functions to the first and second microphones, respectively, with respect to all types of blow interactions, as described in Table 1. For example, the first microphone may be set as movement to a previous page and the second microphone may be set as movement to the next page. In that case, when a blow interaction is created via the first microphone, the controller 600 controls the function of movement to a previous page, set to the first microphone. Likewise, when a blow interaction is created via the second microphone, the controller 600 controls the function of movement to the next page, set to the second microphone.

Next, various types of functions by command keywords, as described in Table 1, can be assigned to the first and second microphones, respectively. Therefore, when a blow interaction is created via the first microphone, the controller 600 identifies a command of the command keywords, matched with the blow interaction, with respect to the first microphone, and then performs a corresponding function. Likewise, when a blow interaction is created via the second microphone, the controller 600 identifies a command of the command keywords, matched with the blow interaction, with respect to the second microphone, and then performs a corresponding function.

Figure 6:
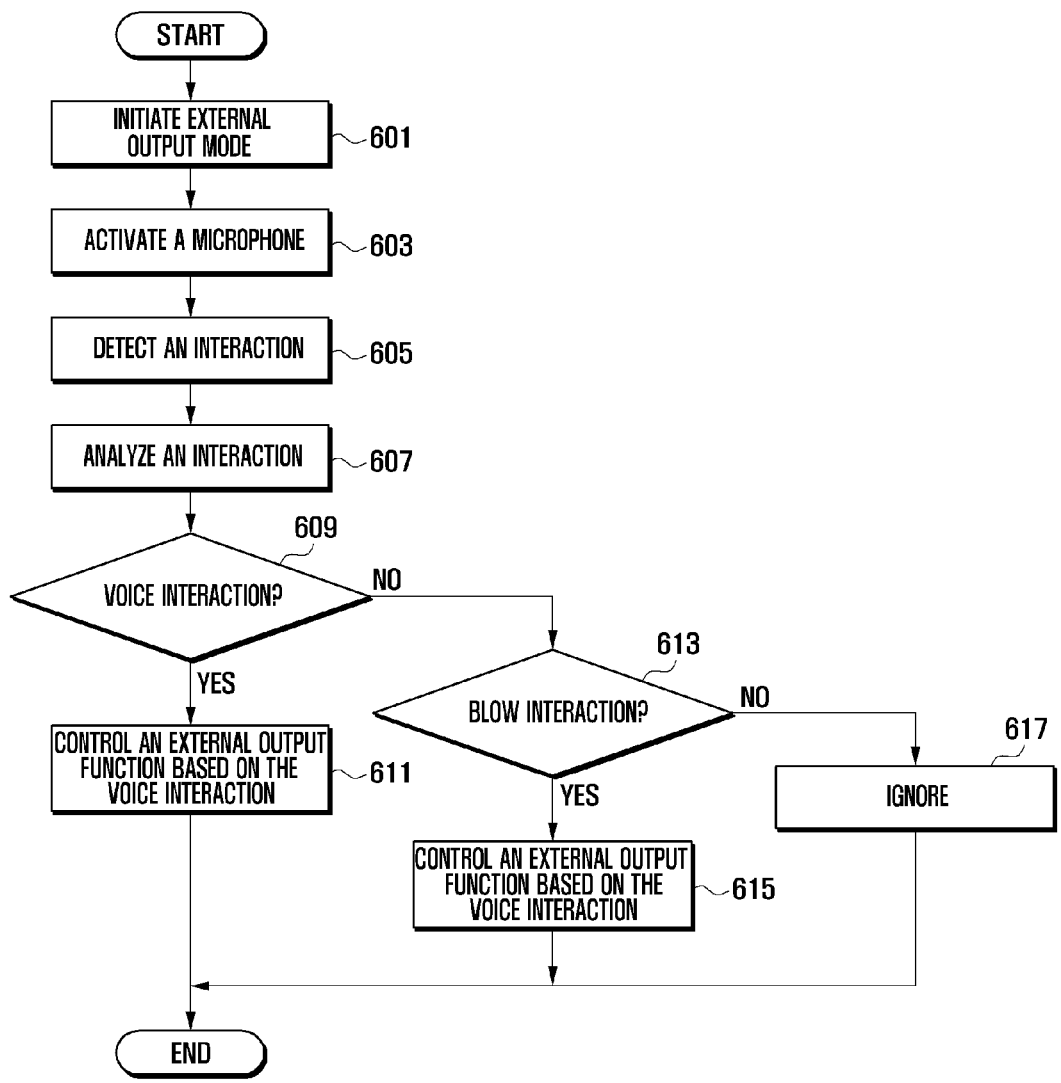
FIG. 6 illustrates a flow chart that describes a method for controlling an external output of a mobile device by recognizing a user's interactions, according to an exemplary embodiment of the present invention.

FIG. 6 illustrates a flow chart that describes a method for controlling an external output of the mobile device by recognizing a user's interactions, according to an exemplary embodiment of the present invention.

Referring to FIG. 6, a user can activate the projection function of the mobile device via an input mechanism of the mobile device, for example, an input unit 200, a display unit 100, microphones, etc. In that case, the controller 600 initiates an external output mode by operating the projector module 300 according to a user's request and projecting screen data for an application onto an external screen 900 via the projector module 300 in step 601. Before operating the projector module 300, the mobile device may be displaying particular screen data for an application, requested by the user, on the display unit 100.

After that, the controller 600 activates the microphone in step 603. In an exemplary embodiment of the present invention, the controller 600 can automatically activate the microphone when operating the projector module 300. Alternatively, the controller 600 can manually activate the microphone when the user creates an input signal for operating the microphone. That is, the controller 600 can operate the microphone in an always listening mode or normal listening mode, according to receiving mode information in preset optional information.

Next, the controller 600 detects a user's interaction input to the microphone during the external output in step 605. That is, the user can input his/her voice or blow for controlling the external output to the microphone of the mobile device. It should be understood that the user can also input his/her voice or blow to a microphone of an external device. The controller 600 can receive an input signal, such as a user's voice or blow, etc., via the microphone. In that case, the controller 600 recognizes that an interaction according to the input signal is created.

The controller 600 analyzes the interaction according to the input signal in step 607. The controller 600 extracts a signal received by the microphone and determines whether the input signal corresponds to a voice interaction based on the extracted signal in step 609.

When the controller 600 ascertains that the input signal corresponds to a voice interaction at step 609, the controller 600 controls the external output function according to the voice interaction, based on preset keyword information, in step 611. This has already been described above with reference to FIG. 4. A detailed description regarding the method for controlling an external output after the interaction analysis will be made further below with reference to FIG. 7.

On the contrary, when the controller 600 ascertains that the input signal does not correspond to a voice interaction at step 609, the controller 600 further determines whether the input signal corresponds to a blow interaction in step 613. When the controller 600 ascertains that the input signal corresponds to a blow interaction at step 613, the controller 600 controls the external output function according to the blow interaction, based on preset keyword information in step 615. This has already been described above with reference to FIG. 5. A detailed description regarding the method for controlling an external output after the interaction analysis will be made further below with reference to FIG. 7.

On the contrary, when the controller 600 ascertains that the input signal does not correspond to a blow interaction at step 613, the controller 600 ignores the input signal of a corresponding interaction in step 617. For example, when the mobile device outputs screen data according to the reproduction of a particular moving image, audio data is output via the speaker and, accordingly, the audio data output from the speaker may be input to the microphone of the mobile device. In that case, the controller 600 can ignore the input signal, which is output from the speaker and then re-input to the microphone, and can receive only a user's voice or blow. This can be achieved by a barge-in function.

Figure 7:
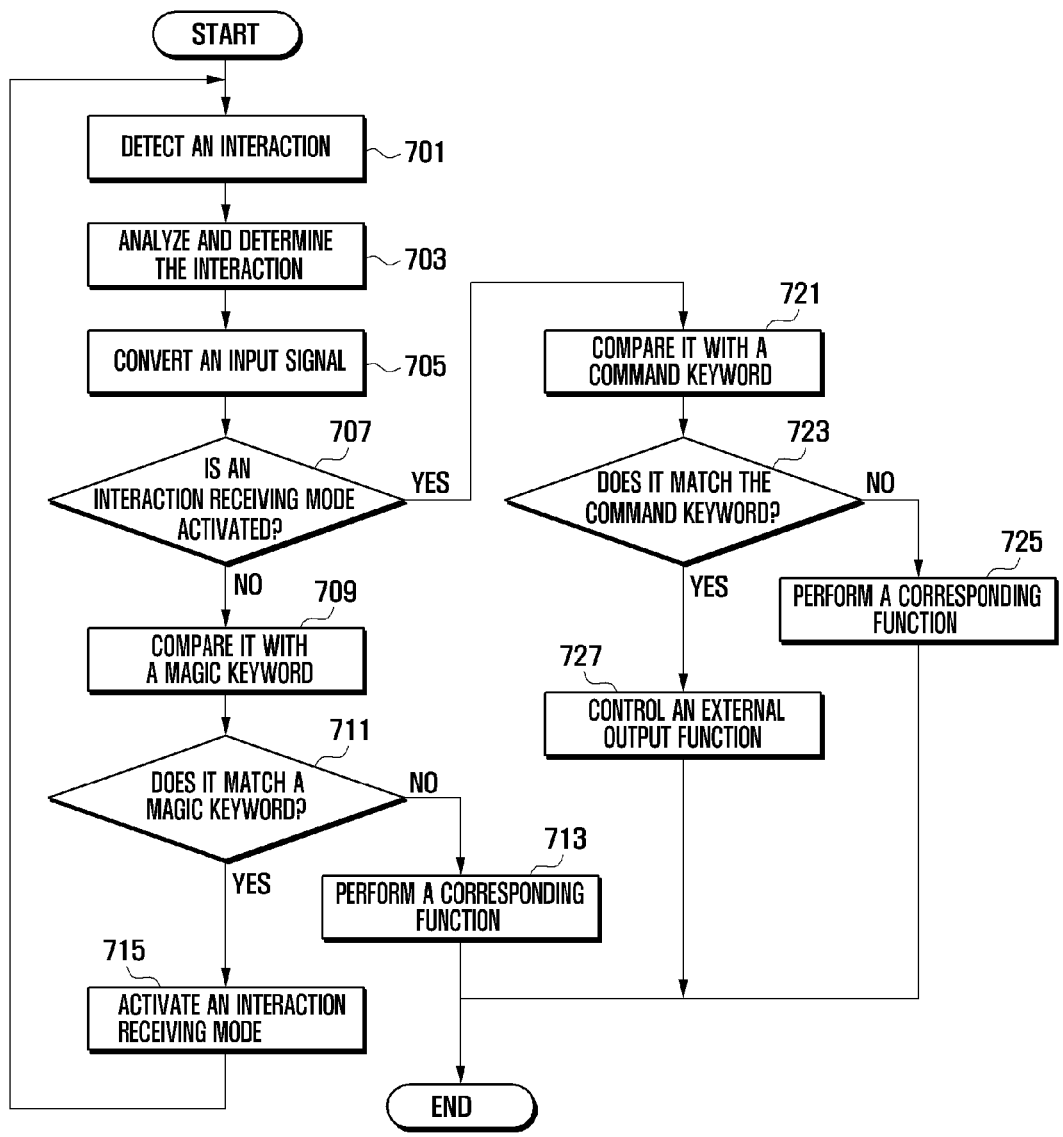
FIG. 7 illustrates a flow chart that describes a method for controlling an external output of a mobile device, based on microphone-based interactions, according to an exemplary embodiment of the present invention.

FIG. 7 illustrates a flow chart that describes a method for controlling an external output of the mobile device, based on microphone-based interactions, according to an exemplary embodiment of the present invention.

Referring to FIG. 7, the controller 600 detects an input signal-based interaction via the microphone when the mobile device is operated in an external output mode in step 701. The controller 600 analyzes the interaction and identifies a type of the interaction in step 703. For example, the controller 600 can determine whether the interaction is a voice interaction or blow interaction. Since the analysis and determination processes of an interaction were described above with reference to FIGS. 3 to 6, their detailed descriptions are not repeated below.

After determining the type of the interaction, the controller 600 performs a conversion for the input signal corresponding to the type of the interaction in step 705. For example, when the type of the interaction is a voice interaction, the controller 600 converts the input signal into a text signal via a STT conversion mode. Likewise, when the type of the interaction is a blow interaction, the controller 600 converts the input signal into a sound pressure signal via a sound pressure conversion mode. Since these conversion processes were described above with reference to FIGS. 3 to 6, their detailed descriptions are not repeated below.

After completing the conversion process for the input signal, the controller 600 determines whether an interaction receiving mode is activated or deactivated in step 707. That is, the controller 600 determines whether an interaction receiving mode is activated by the creation of an interaction corresponding to a user's magic keyword before the interaction is transferred from the microphone.

When the controller 600 ascertains that an interaction receiving mode is deactivated at step 707, the controller 600 compares the converted text signal or sound pressure signal (hereinafter called a 'converted signal') with the keyword information in step 709. In particular, the controller 600 can compare the converted signal with a magic keyword of the keyword information. The controller 600 determines whether the converted signal matches a magic keyword of the keyword information in step 711.

When the controller 600 ascertains that the converted signal does not match a magic keyword of the keyword information at step 711, the controller 600 performs a corresponding function in step 713. For example, the controller 600 ignores an input signal input to the microphone. In addition, the controller 600 displays guide information, stating that the user's requested interaction does not match preset keyword information, on at least one of the internal screen data and external screen data, and may also outputs an alert sound via the speaker.

On the contrary, when the controller 600 ascertains that the converted signal matches a magic keyword of the keyword information at step 711, the controller 600 activates an interaction receiving mode in step 715. As described in the section referring to diagram 403 of FIG. 4, the controller 600 can output the executable command information 800 on at least one of the internal screen data and external screen data, according to the preset display information. After activating an interaction receiving mode at step 715, the controller 600 returns to step 701 where the controller 600 waits for a new interaction. When the controller 600 detects a new interaction, the controller 600 performs the processes described above.

Meanwhile, when the controller 600 ascertains that an interaction receiving mode is activated at step 707, the controller 600 compares the converted signal with the keyword information in step 721. In particular, the controller 600 can compare the converted signal with a command keyword of the keyword information. The controller 600 determines whether the converted signal matches a command keyword of the keyword information in step 723.

When the controller 600 ascertains that the converted signal does not match a command keyword of the keyword information at step 723, the controller 600 performs a corresponding function in step 725. For example, the controller 600 ignores an input signal input to the microphone. In addition, the controller 600 displays guide information, stating that the user's requested interaction does not match preset keyword information, on at least one of the internal screen data and external screen data, and also outputs an alert sound via the speaker.

On the contrary, when the controller 600 ascertains that the converted signal matches a command keyword at step 723, the controller 600 controls an external output function according to a corresponding command keyword in step 727. When the controller 600 searched for a command keyword matching the converted signal, the controller 600 extracts a function assigned to the command keyword. After that, the controller 600 creates a control interaction according to the extracted function and controls an external output function. As described in the section referring to diagram 405 of FIG. 4, the controller 600 can output the execution information 850 on at least one of the internal screen data and external screen data, according to the preset display information.

As described above, the method and system, according to exemplary embodiments of the present invention, can allow the user to simply control a function for screen data that is being output, via microphones installed as a component of the mobile device, irrespective of the mobile device's environment to output the screen data. The method and system according to exemplary embodiments of the present invention can allow the user to control an external output function, via the microphones installed as a component of the mobile device or external devices, without contacting the mobile device, so that the screen data can be projected to an external screen without being shaken or varying its location.

In addition, the method and system, according to the exemplary embodiments of the present invention, can simply create control interactions when the mobile device performs an external output function, based on internal or external microphones, irrespective of a user's environment such as a dark place or a bright place, and controls various functions for the screen data output to an external screen, where the various functions include channel switch, screen switch, page switch, increase/decrease of volume, Fast Forward (FF), REWind (REW), pause, playback, image switch, slide show, etc.

The above-described methods according to exemplary embodiments of the present invention can be implemented in hardware or as software or computer code that can be stored in a recording medium such as a Compact Disc (CD) ROM, an RAM, a floppy disk, a hard disk, or a magneto-optical disk or downloaded over a network, so that the methods described herein can be rendered in such software using a general purpose computer, or a special processor or in programmable or dedicated hardware, such as an Application Specific Integrated Circuit (ASIC) or a Field Programmable Gate Array (FPGA). As would be understood in the art, the computer, the processor or the programmable hardware include memory components, e.g., a RAM, a ROM, a Flash, and the like. That may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been show and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for controlling an external output of a mobile device, the method comprising:
    activating a microphone according to preset optional information when the mobile device enters an external output mode;
    performing an external output operation in the external output mode;
    activating an interaction receiving mode when detecting an audio signal corresponding to a preset keyword information, the audio signal being input to the microphone;
    detecting, in the interaction receiving mode, an interaction input to the microphone to extract an input signal from the detected interaction;
    identifying a type of the detected interaction based on the input signal;
    performing a conversion for the input signal corresponding to the type of the detected interaction; and
    controlling the external output according to a converted input signal.

2. The method of claim 1, further comprising:
    one of turning on and turning off a display unit of the mobile device when controlling external screen data according to the interaction in the external output mode; and
    outputting, when the display unit is turned on, internal screen data that is one of identical to and different from the external screen data, on the display unit.

3. The method of claim 1, wherein the controlling of the external output comprises:

creating a control interaction based on the converted input signal; and
controlling the external output based on the control interaction.

4. The method of claim 3, wherein the activating of the interaction receiving mode comprises:
    determining whether the interaction receiving mode is activated or deactivated;
    comparing the audio signal with the preset keyword information when the interaction receiving mode is deactivated; and
    activating the interaction receiving mode when the audio signal matches the preset keyword information.

5. The method of claim 3, wherein the controlling of the external output comprises:
    determining whether the interaction receiving mode is activated or deactivated;
    comparing the converted input signal with command keyword information when the interaction receiving mode is activated; and
    creating, when the converted input signal matches the command keyword information, a control interaction corresponding to the command keyword information.

6. The method of claim 5, wherein the controlling of the external output further comprises:
    searching for, when the type of the interaction is a voice interaction, a voice command keyword matching the converted input signal, from the command keyword information.

7. The method of claim 5, wherein the controlling of the external output further comprises:
    searching for, when the type of the interaction is a blow interaction, a blow command keyword matching the converted input signal, from the command keyword information.

8. The method of claim 3, wherein the controlling of the external output comprises:
    identifying a type of the interaction, based on a new input signal that is input to the microphone in the activated interaction receiving mode;
    performing a conversion for the new input signal in a conversion mode corresponding to the identified type of the interaction;
    comparing the new converted input signal with a command keyword information; and
    controlling the external output, based on a control interaction corresponding to the command keyword information matching the new converted input signal.

9. The method of claim 8, further comprising:
displaying executable command information on at least one of internal screen data, displayed on the mobile device, and external screen data displayed on an external screen,
wherein the executable command information can be executed when the interaction receiving mode is activated.

10. The method of claim 8, further comprising:
displaying execution information, stating that a function is executed when the external output is controlled according to the control interaction, on at least one of internal screen data, displayed on the mobile device, and external screen data displayed on an external screen.

* * * * *